J. BULLINGER.
TRAIN PIPE COUPLING.
APPLICATION FILED SEPT. 29, 1917.

1,320,987.

Patented Nov. 4, 1919.

Inventor
Joseph Bullinger,

Witness

By Victor J. Evans
Attorney

UNITED STATES PATENT OFFICE.

JOSEPH BULLINGER, OF KANSAS, OHIO.

TRAIN-PIPE COUPLING.

1,320,987. Specification of Letters Patent. Patented Nov. 4, 1919.

Application filed September 29, 1917. Serial No. 194,009.

*To all whom it may concern:*

Be it known that I, JOSEPH BULLINGER, a citizen of the United States, residing at Kansas, in the county of Seneca and State of Ohio, have invented new and useful Improvements in Train-Pipe Couplings, of which the following is a specification.

This invention relates to improvements in train pipe couplings, especially such as are used in connection with air brake apparatus on railroad trains, the object of the invention being to provide an improved coupling of this kind which is simple in construction, is strong and durable, and which is automatic in operation.

The invention consists in the construction, combination and arrangement of devices hereinafter described and claimed.

In the accompanying drawings:—

Figure 1:
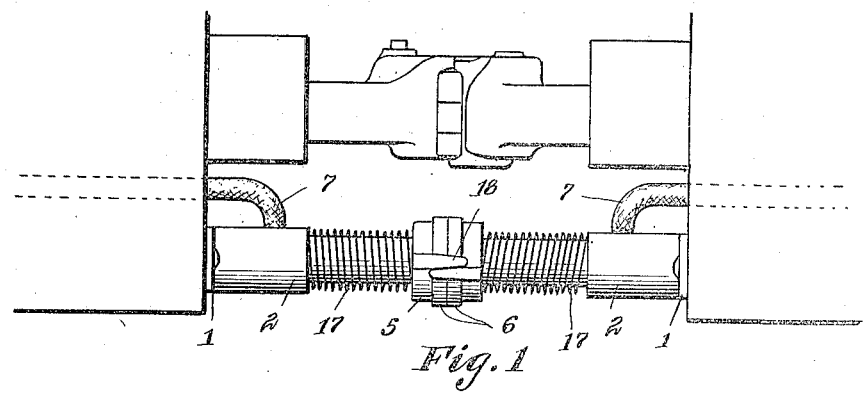
Figure 1 is an elevation of a train pipe coupling constructed in accordance with my invention.
Figure 2:
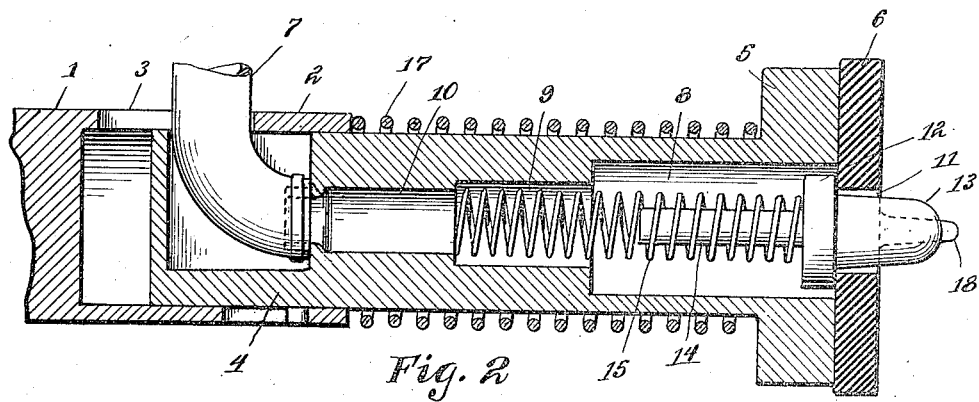
Fig. 2 is a detailed sectional view of the same on a larger scale.
Figure 3:
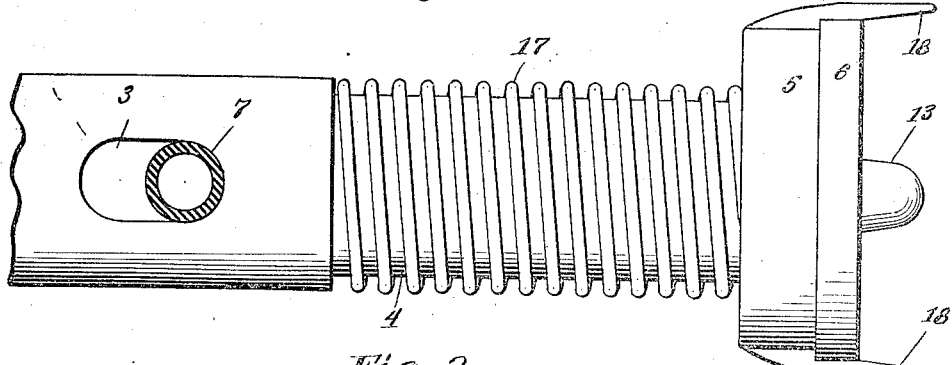
Fig. 3 is a detailed plan of the same.

My improved train pipe coupling comprises two units for use on the opposing ends of railroad cars. These units are identical in construction and hence I will describe only one of them.

A socket member 1 is provided which is secured under a car and preferably under the draw-bar thereof to adapt the unit to participate in the relative movement of the draw-bar. The socket comprises a horizontally arranged tubular arm 2 which is provided in one side with a slot 3. A tubular member 4 which is preferably made of iron or steel has its inner end arranged in the tubular arm of the socket for longitudinal movement and is provided with suitable means to limit the outward movement of said tubular member. At its outer end the tubular member is provided with a diametrically enlarged head 5 and on the outer end of the tubular member is a disk 6 which is made of rubber or other suitable yielding material.

A flexible pipe 7 of rubber or other suitable material has one end inserted through the slot of the coupling and connected to the inner end of the tubular member 3. The tubular member is provided at its outer end with a counter-bore 8 and is also provided with a counter-bore 9 of somewhat less diameter than the counter-bore 8 and between the latter and bore 10, the bore of the flexible pipe or hose being coincident with that of the tubular member. The disk 6 has a central opening 11. A valve 12 is arranged for movement in the counter-bore 8 and is adapted to close against the same to close the opening 11. The valve is provided with an outwardly tapered head 13 on its outer side which passes through the opening 11 and the valve is provided on its inner side with a stem 14. A coiled extensile spring 15 is arranged partly in the counter-bore 9 and partly in the counter-bore 8 and around the valve stem, one end of the spring bearing against the valve and the other end of the spring bearing against the shoulder formed at the inner end of the counter-bore 9 as shown. The spring forces the valve outwardly and serves to normally hold the latter against the inner side of the disk, to close the opening 11 when the cars are uncoupled. A coiled extensile spring 17 is arranged around the tubular member 4, the inner end of the spring bearing against the socket and the outer end thereof bearing against the head 5, the spring serving to normally project the tubular member by permitting the same to yield.

When the cars come together the disks 6 come in contact with each other and the heads 13 of the valves also come in contact with each other so that the valves are forced inwardly against the tension of the springs 15 and hence communication is established between the coupling units through the pipes 7, tubular members 4 and the openings 11. The disks 6 are provided with arms 18 which project therefrom and which serve to arrange the disks concentrically when the coupling units come together. When the cars are coupled and moved apart the springs 15 move the valves to closed position. The tension of the spring 17 is such as to closely and tightly hold the disks 6 together while the cars are coupled and prevent leakage of the train pipe coupling.

While I have herein shown and described a preferred form of my invention, I would have it understood that changes may be made in the form, proportion and construction of the several parts without departing from the spirit of my invention and within the scope of the appended claim.

Having thus described my invention, I claim:—

A device of the character described comprising two similar members adapted for engagement with each other and in end to end relation and each comprising a body having a cylindrical socket and a longitudinal slot communicating therewith, a tubular member having one end mounted for slidable movement within said socket and its other end provided with an enlarged head, said tubular member being provided at said last named end with a bore of relatively large diameter, intermediate its ends with a bore of less diameter, and having at its other end a bore of still less diameter defining with said second named bore a shoulder, an air conducting pipe extending through said slot and connected with the adjacent end of said last named bore, a resilient facing on the outer face of said head and provided with a central opening, a valve disposed within said first named bore and having a stem extending longitudinally therein, a spring surrounding said stem and abutting at one end against said valve and at its other end against said shoulder, a valve unseating projection extending from said valve through the hole in said facing, and means resiliently urging said tubular member toward the outermost end of said socket.

In testimony whereof I affix my signature.

JOSEPH BULLINGER.

Copies of this patent may be obtained for five cents each, by addressing the "Commissioner of Patents, Washington, D. C."